US009967309B2

United States Patent
Brown et al.

(10) Patent No.: US 9,967,309 B2
(45) Date of Patent: May 8, 2018

(54) DYNAMIC LOADING OF ROUTES IN A SINGLE-PAGE APPLICATION

(71) Applicant: Microsoft Technology Licensing, LLC, Redmond, WA (US)

(72) Inventors: Derek Brown, San Jose, CA (US); Abhishek Pandya, Santa Clara, CA (US); Zachary Mulgrew, Burlingame, CA (US); Jordan Smith, Santa Clara, CA (US); Adam Miller, San Francisco, CA (US); Asa Kusuma, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 754 days.

(21) Appl. No.: 14/507,644

(22) Filed: Oct. 6, 2014

(65) Prior Publication Data
US 2016/0100030 A1 Apr. 7, 2016

(51) Int. Cl.
*G06F 15/16* (2006.01)
*H04L 29/08* (2006.01)
*G06F 3/0482* (2013.01)
*G06F 9/445* (2018.01)

(52) U.S. Cl.
CPC ............ *H04L 67/02* (2013.01); *G06F 3/0482* (2013.01); *G06F 9/44521* (2013.01)

(58) Field of Classification Search
USPC ........................................................ 709/217
See application file for complete search history.

(56) References Cited

U.S. PATENT DOCUMENTS

| | | | | |
|---|---|---|---|---|
| 6,076,107 A | * | 6/2000 | Chen | H04L 41/0213 709/202 |
| 6,181,692 B1 | * | 1/2001 | DeGolia, Jr. | H04L 12/66 370/351 |
| 6,393,486 B1 | * | 5/2002 | Pelavin | H04L 41/0813 709/238 |

(Continued)

OTHER PUBLICATIONS

Ember.JS, "Routing: Defining Your Routes" http://emberjs.com/guides/routing/defining-your-routes/, last viewed on Oct. 10, 2014, 10 pages.

(Continued)

*Primary Examiner* — Alicia Baturay
(74) *Attorney, Agent, or Firm* — Hickman Palermo Becker Bingham LLP; Daniel D. Ledesma

(57) ABSTRACT

Techniques for dynamically loading route and dependency information in a single-page application (SPA) that executes on a client device are provided. In one technique, a SPA includes a route handler that receives a requested route. The route handler determines whether the requested route matches any route in a list of routes. The only route that the request route may "match" is a wildcard route, which is associated with a function, when called with the requested route as input, causes a server request to be generated and transmitted from the client device to a server. The server responds with the requested route, dependency information for the requested route, and, optionally, one or more other routes, which may be "child" routes of the requested route. A module instance is generated based on the dependency information and loaded into the SPA.

22 Claims, 3 Drawing Sheets

(56) References Cited

U.S. PATENT DOCUMENTS

| | | | | |
|---|---|---|---|---|
| 6,658,464 B2* | 12/2003 | Reisman | G06F 8/65 | 705/31 |
| 6,883,034 B1* | 4/2005 | Pelavin | H04L 45/00 | 370/351 |
| 6,993,531 B1* | 1/2006 | Naas | G06F 17/30873 | |
| 7,126,941 B1* | 10/2006 | Clemm | H04L 41/0806 | 370/352 |
| 7,274,658 B2* | 9/2007 | Bornstein | H04L 29/06 | 370/227 |
| 7,292,541 B1* | 11/2007 | C S | H04L 41/12 | 370/254 |
| 7,466,710 B1* | 12/2008 | Clemm | H04L 41/0873 | 370/401 |
| 7,555,561 B2* | 6/2009 | Michel | G06F 17/30902 | 709/218 |
| 7,936,754 B2* | 5/2011 | Napierala | H04L 45/00 | 370/328 |
| 8,260,757 B1* | 9/2012 | Chatterjee | G06F 17/30566 | 370/230 |
| 8,447,837 B2* | 5/2013 | Devanneaux | G06F 17/30902 | 709/203 |
| 8,694,993 B1* | 4/2014 | Dotan | H04L 67/42 | 709/203 |
| 8,725,987 B2* | 5/2014 | Jones | G06F 12/0862 | 711/118 |
| 9,001,662 B2* | 4/2015 | Funabashi | H04W 36/32 | 370/235 |
| 9,118,623 B2* | 8/2015 | Devanneaux | G06F 17/30902 | |
| 9,244,660 B2* | 1/2016 | Chauhan | G06F 8/38 | |
| 9,455,920 B2* | 9/2016 | Gopalarathnam | H04L 47/17 | |
| 9,507,971 B2* | 11/2016 | Herzig | G06K 1/121 | |
| 9,594,846 B2* | 3/2017 | Pinto | H04L 67/2842 | |
| 9,633,380 B2* | 4/2017 | Zdorovtsov | G06Q 30/0279 | |
| 9,679,332 B2* | 6/2017 | Kim | G06Q 30/0643 | |
| 2015/0227514 A1* | 8/2015 | Gillett | G06F 17/30011 | 707/608 |
| 2015/0278171 A1* | 10/2015 | Lefebvre | G06F 17/2247 | 715/760 |
| 2015/0281321 A1* | 10/2015 | Hrytsevich | H04L 67/26 | 709/203 |

OTHER PUBLICATIONS

Ember, "Routes Unknown Until Runtime, Dependant on API Response", dated Jun. 2014, 7 pages.

Oh Jaewon et al., "Automated Transformation of Template-Based Web Applications into Single-Page Applications", dated 2013 IEEE 37th Annual Computer Software and Applications Conference, Jul. 22, 2013.

European Patent Office, "Search Report" in application No. PCT/US2015/044320, dated Dec. 8, 2015, 14 pages.

European Claims in application No. PCT/US2015/044320, dated Dec. 2015, 3 pages.

Ali Mesbah et al., "Spiar: An Architectural Style for Single Page Internet Applications", Reports of Centrum Voor Wiskunde En Informatica, Amsterdam, NL dated Apr. 1, 2006, 12 pages.

* cited by examiner

DYNAMIC LOADING OF ROUTES IN A SINGLE-PAGE APPLICATION

FIELD OF THE DISCLOSURE

The present disclosure relates generally to single-page applications and, more specifically, to dynamically loading routes and dependency information using a single route handler.

BACKGROUND

A single-page application (SPA) is a web application that runs on a client device and fits in a single web page. A web application is application software that runs in a web browser and is created in a browser-supported programming language (such as the combination of JavaScript, HTML and CSS) and relies on a web browser to render the web application. An aim of SPAs is to provide a more fluid user experience, similar to a desktop application. A web page provided by a SPA does not reload at any point while the SPA is executing, nor does control transfer to another web page.

A traditional approach to SPA development is to include, in a SPA executing on a client device, a route handler that has access to all possible routes (such as URL fragments) that a user might select while interacting with the SPA. The traditional approach also involves a SPA including "dependencies" for each possible route. "Dependencies" refers to files for each module (or sub-application) that is associated with one or more of the routes. Such module files include JavaScript and CSS files, which are typically much larger than HTML files. HTML files, on the other hand, may be retrieved from a web server in response to a user request for a specific route. Thus, user interaction with a SPA often involves dynamic communication with a web server.

One benefit of a SPA having access to all routes and associated module files at loading time, even before any routes are requested, is that page refresh is avoided and time to page view is minimal.

An alternative to the SPA approach is the multi-page application approach where route handling is performed by a server that receives requests from a web application executing on the client device. However, in response to each user request, a page refresh is required, resulting in poor user experience.

However, the SPA approach is not without its disadvantages. For example, the time to load an SPA, along with all possible routes and files for each module, can be significant, especially if the number of routes and module files is relatively large. As another example, for large SPAs, developing a single route handler that has access to all possible routes and dependencies of each route at SPA loading time can be cumbersome, especially when different development teams are each separately developing a module that is associated with a subset of the possible routes.

One approach that might alleviate the disadvantages of the SPA approach is to develop a route handler for each module. For example, an SPA includes a route handler that has access to three routes: "/profile/", "/mail/", and "/search/", but does not have access to any child routes of these routes. The route handler also has access to dependency information for each of these three routes. Then, if a user selects the "/profile/" route, then child routes of "/profile/" and associated dependent information are retrieved and a profile module is loaded. Then, if the user wants to access route "/mail/", the route handler for the profile module would return an error because the route handler for the profile module does not have access to any routes related to "/mail/". Thus, implementing a separate route handler for each module does not allow a user to access all the modules associated with a SPA.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for a route handler that utilizes dynamic route and dependency loading in a single-page application (SPA) environment. A route handler is a process that is initiated when a SPA is loaded on a client device. The route handler may initially not have access to at least some routes that a user might request. The route handler eventually receives a request that includes a route that is associated with dependency information, both of which are not available on the client device. Instead of displaying an error message that the request route is unknown to the route handler, the route handler causes the requested route to be sent to a server, which responds with the requested route and dependency information for the requested route.

System Overview

Figure 1:
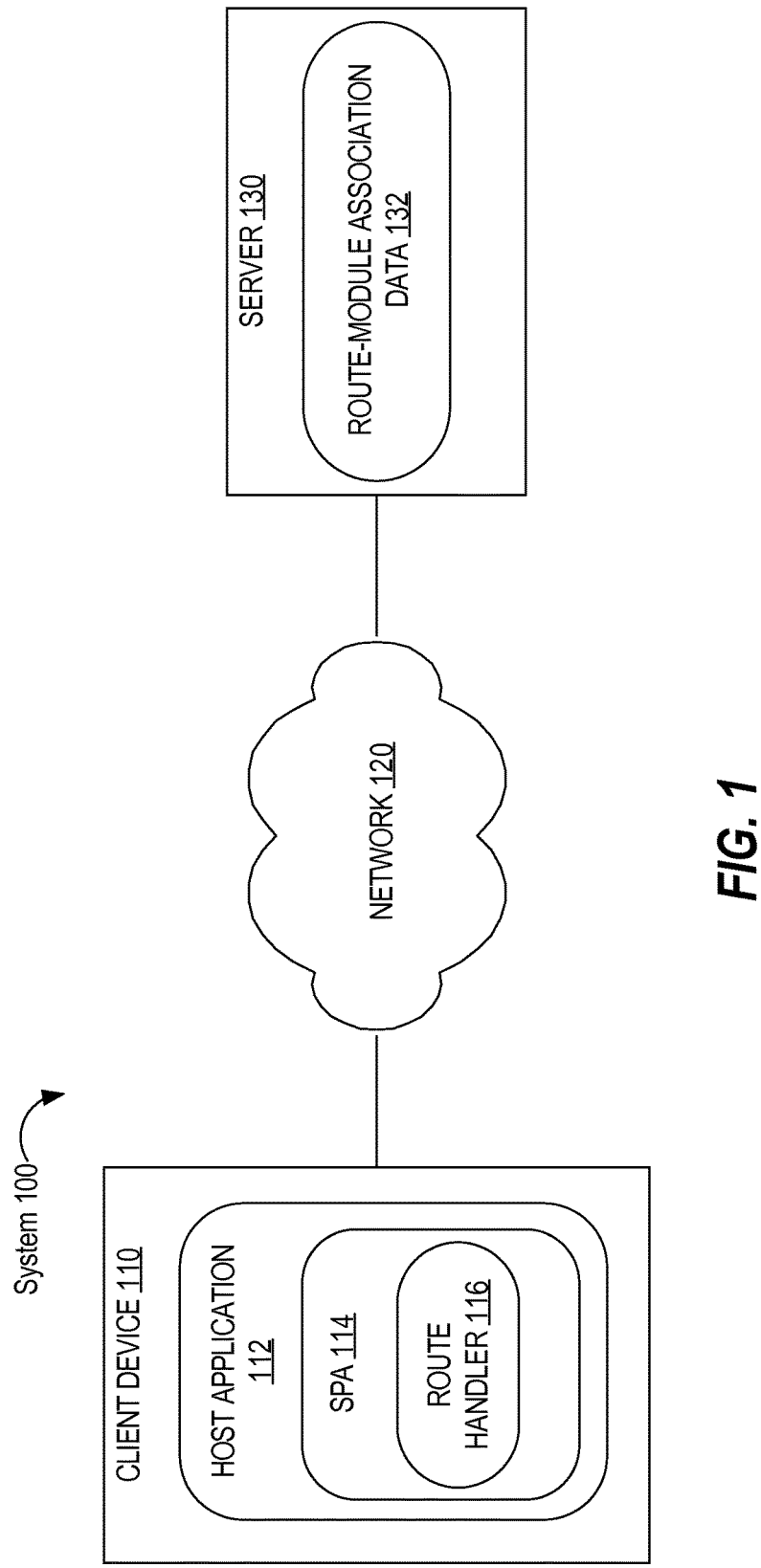
FIG. 1 is a block diagram that depicts an example system for handing route requests on a client device, in an embodiment.

FIG. 1 is a block diagram that depicts an example system 100 for handing route requests on a client device, in an embodiment. System 100 includes a client device 110, a network 120, and a server 130. Although only one client device 110 is depicted in system 100, system 100 may include many client devices. Similarly, although only one server 130 is depicted in system 100, system 110 may include multiple servers that support client device 110. For example, if server 130 fails or is overloaded, requests from client device 110 may be redirected to another server that can respond to those requests.

Examples of client device 110 include a laptop computer, a tablet computer, a smartphone, and a desktop computer.

Client device 110 includes a host application 112 that executes thereon. An example of host application 112 is a web browser that is configured to accept (as input) URLs of many different domains, communicate with one or more domain name servers (DNSs) to lookup IP addresses of the URLs, and communicate with web servers associated with the IP addresses. Examples of web browsers include Chrome, Firefox, Safari, and Internet Explorer. Another example of host application 112 is a client-side application, such as a mobile application, that is configured to communicate with a single web domain, which may be supported by multiple web servers.

Network 120 may be implemented by any medium or mechanism that provides for the exchange of data between client device 110 and server 130. Examples of network 120 include, without limitation, a network such as a Local Area Network (LAN), Wide Area Network (WAN), Ethernet or the Internet, or one or more terrestrial, satellite or wireless links.

Server 130 is a component that is configured to process and respond to requests from host application 112 and other instances of host application 112 executing on other client devices (not depicted in FIG. 1). For example, in response to a request from host application 112, server 130 provides files and data (of a single-page application 114) that host application 112 processes to load and execute the single-page application 114 within host application 112.

Server 130 stores or has access to route-module association data 132 that associates routes (either complete URLs or URL fragments) with data files. A set of one or more data files corresponds to a module that SPA 114 generates based on processing the corresponding data file(s). For example, the association data may associate (1) the route "/profile/" with data files that are used to generate a profile module (or sub-application), (2) the route "/search/" with data files that are used to generate a search module, and (3) the route "/mail/" with data files that are used to generate a mail module. Each module allows a user of client device 110 to initiate certain actions. For example, the profile module may allow a user to view a user's profile, edit a user's profile, and share a user's profile. Similarly, the search module may allow a user to initiate a search of a social network, edit a previous search, and save search results. Similarly, the mail module may allow a user to view all of the user's electronic messages, view electronic messages that satisfy certain criteria, and create, send, reply to, and forward electronic messages.

Examples of data files of a module include JavaScript files and Cascading Style Sheets (CSS) files. Data files for a single module may also include one or more HTML files. If a single module is associated with multiple routes, then each route corresponds to a single web document. For example, a profile module may be associated with routes "/profile/view/", "/profile/edit/", and "/profile/share/". Thus, the same JavaScript files and CSS files may be used to generate web pages for the three different routes, but three different HTML files (i.e., one for each of the three routes) may be associated with the profile module. The different HTML files are used to generate web pages when the respective routes are selected for viewing.

Server 130 may be implemented in software, hardware, or a combination of software and hardware. Server 130 may be implemented on a single computing device or multiple computing devices.

Host application 112 submits a (e.g., HTTP) request for data from server 130. The request may be initiated by a user entering in a URL in a text field of host application 112 and providing input (e.g., selecting a key on a keyboard or voice input). Alternatively, the request may be initiated by a user selecting a graphical icon that is displayed on a screen of client device 110. The request is transmitted over network 120 to server 130. In reply, server 130 sends HTML and other data resources, such as JavaScript files and CSS files, to client device 110.

In response to receiving the HTML and other data resources, SPA 114 creates a document object model (DOM) based on module-specific template files that are typically loaded as part of a dependency loading step. SPA 114 initiates a route handler 116, which is a process that configured to receive and process route requests and load the appropriate module based on a particular route request. In multi-page applications, the route handler is implemented on the server instead of on the client that submits route requests.

A route request indicates a route, which is a fragment of a URL, such as "/search/", "/profile/", or "/mail/". Alternatively, a route may be a complete URL, such as "http://www.examplecompany.com/search/". A route request may be initiated based on input from a user. For example, the input may be user selection of a link or button that is associated with a particular route. As another example, the input may a user selecting multiple keys on a keyboard, which may be physical or graphical. Alternatively, a route request may be initiated automatically. For example, SPA 114 automatically initiates a route request if, based on user selection history of frequently selecting a particular route (e.g., "/mail/") while a particular web page is displayed, the user is more than likely to select that particular route.

Examples Process

Figure 2:
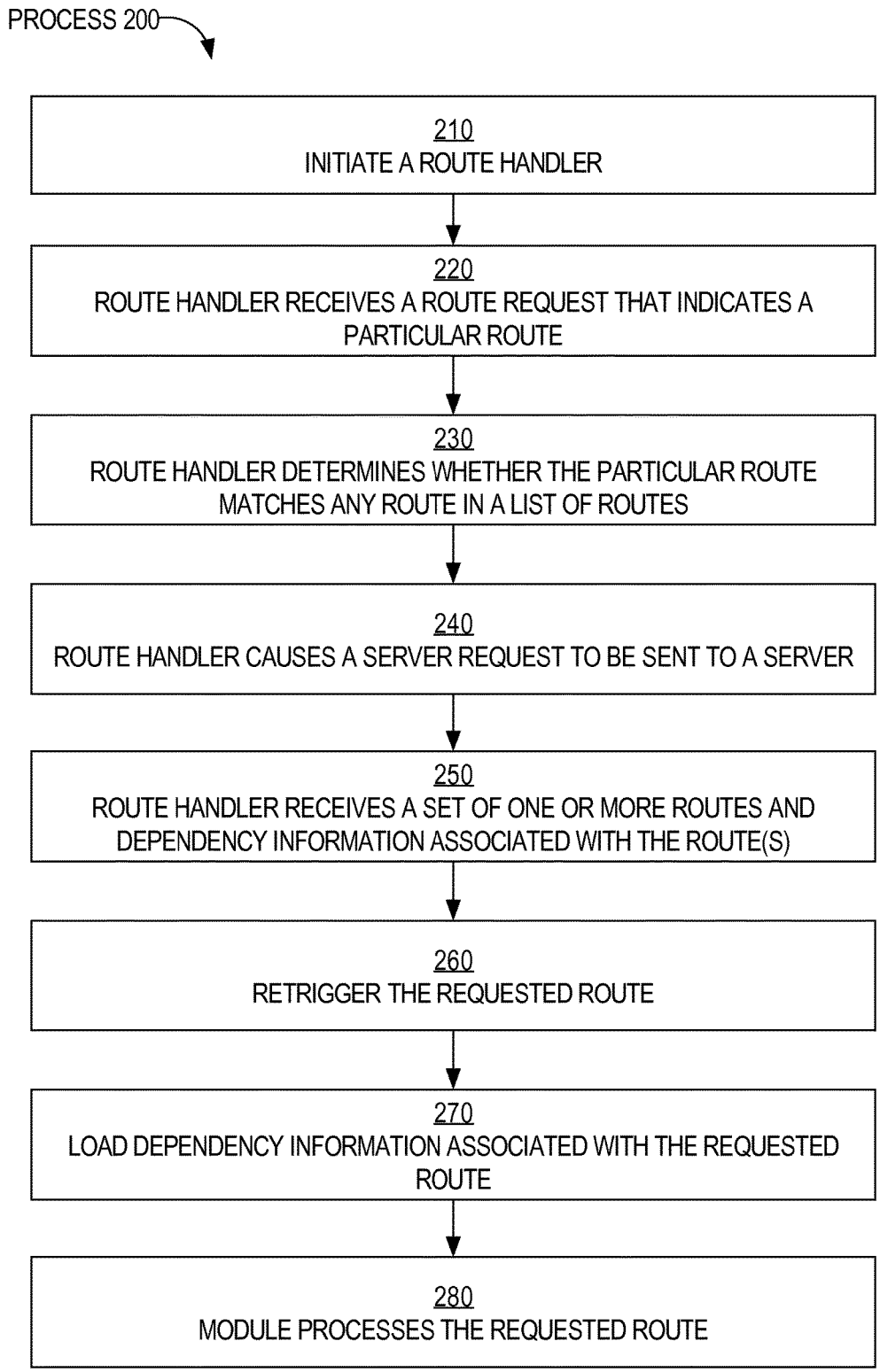
FIG. 2 is a flow diagram that depicts an example process for handing route requests on a client device, in an embodiment.

FIG. 2 is a flow diagram that depicts an example process 200 for handing route requests on a client device, in an embodiment. Process 200 is performed on client device 110.

At block 210, route handler 116 is initiated by SPA 114. Route handler 116 may be initiated in response to data files (e.g., JavaScript files and CSS files) being loaded within host application 112 and SPA 114 starting up. Initially, route handler 116 may not have access to one or more routes that are possible for a user to select. Additionally, client device 110 may not store any dependency information (associated with the one or more routes) for running a module within host application 112.

At block 220, route handler 116 receives a route request that indicates a particular route. The route request may be received from SPA 114 based on user interaction with SPA 114, such as selection of a button or a link that is displayed on a screen of client device 110.

At block 230, route handler 116 determines that the particular route does not match any route in a list of routes that route handler 116 maintains. Route handler 116 may maintain only a single list of routes. Initially, the list of routes may be empty. The absence of a requested route in the list of routes indicates that the currently-loaded module (e.g., SPA 114 initially or another module) cannot process the requested route.

At block 240, route handler 116 causes a server request to be sent over network 120 to server 130. The server request may be a HTTP request and may comprise a complete URL. For example, while the route request may be a URL fragment (e.g., "/search/") the server request may be the entire associated URL ("http://www.examplecompany.com/search/").

At block 250, route handler 116 receives, from server 130, a set of one or more routes and one or more dependencies, such as JavaScript files, CSS files, and images, for a module that corresponds to the requested route. A module is designed as a stand-alone application. Using modules as part of an application architecture provides numerous benefits, such as reducing the size of the main application, encapsulating related functionality into a single module, reusability in terms of being able to load a single module into different host applications, and integrating third-party modules into a main application.

If multiple routes are received from server 130 in block 250, then one or more of the multiple routes may be "child" routes of the requested route. For example, if the requested route is "/profile/", then other routes that are received from server 130 along with the requested route may be "/profile/edit", "/profile/view", and "/profile/share". Such "child" routes may or may not be associated with another module. Thus, the same module that is able to serve requested route "/profile/" may also be able to server requested route "/profile/edit/".

Block 250 also involves inserting the requested route and any other routes, such as child routes of the requested route, into the list of routes that route handler 116 maintains. If the list of routes was not empty when route handler 116 causes the server request to be sent (in block 240), then the list of routes may be emptied prior to inserting the routes received from server 130.

At block 260, in response to receiving the requested route, the requested route is retriggered, which involves route handler 116 identifying the requested route in the list of routes.

At block 270, the appropriate dependencies for the module associated with the requested route are identified and loaded into SPA 114. Block 270 may be performed by a route handler of host application 112. Each module (or sub-application) comprises a separate route handler that handles (while loaded) any future route requests. Thus, route handler 116 is no longer the current router handler, unless its associated module or application is reloaded.

At block 280, the loaded module processes the requested route and displays, based on the requested route, the appropriate data on the screen of client device 110. For example, if requested route is "/profile/", then a module for displaying profile information of the user of client device 110 is loaded. Block 280 may also involve SPA 114, or the loaded module, retrieving web content from server 130 if the web content was not previously downloaded to client device 110 in block 250.

Unknown Route

As described previously with respect to block 230, it is possible that a user initiates a requested route that is not found in a route handler's list of routes. Such a route is referred to herein as an "unknown route." To handle such a scenario, typical implementations of a SPA include a wildcard route in a route handler's list of routes. A wildcard route may be "/*" that acts as a catchall if the requested route does not match any other route in the list of routes. The wildcard route may be associated with function call or message for display, such as "404( )", indicating that the route handler calls a 404 error function, which causes an error message to be displayed to a user. The error function is called for unknown routes. If a route handler scans its list of routes in a particular order, then the wildcard route may be placed at the end of the list of routes to ensure that the error function is only called if the requested route is unknown.

In an embodiment, instead of associating an error function with a wildcard route, a routing function is associated with the wildcard route. Thus, route handler 116 calls the routing function (referred to herein as a "wildcard routing function") if the requested route is unknown (e.g., if the requested route is not found in the list of routes before route handler 116 reaches the wildcard route). The wildcard routing function determines whether there are any modules or sub-applications that map to the requested route within host application 112. If so, then the wildcard routing function loads the dependencies for the requested route. Otherwise, the wildcard routing function causes a server request (that includes the requested route) to be transmitted over network 120 to server 130.

If a route appears in a route list, then that means that the dependency information for that route may be already loaded or otherwise stored on client device 110. However, the wildcard routing function logic may be executed on the route anyway.

Server 130 receives the requested route from client device 110, identifies data files that are associated with the requested route (e.g., using route-module association data 132), and sends the data files to client device 110. The data files include data files that are used to initialize and execute a module within SPA 114 and display web content. The data files may include JavaScript files, CSS files, and/or HTML files.

Subsequent Route Requests

As noted previously, route handler 116 may receive multiple routes in response to a single server request that includes an unknown route. For example, an unknown route may be route "/profile/" and server 130 may reply to a server request that indicates route "/profile/" by also sending routes "/profile/edit/", "/profile/view/", and "/profile/share/". Route handler 116 includes the additional routes in its list of routes. Later, after the appropriate module is loaded into SPA 114, a user may initiate one or more additional route requests. An additional requested route may match one of the routes that route handler 116 recently received. Continuing with the example, the next requested route may be "/profile/edit/", indicating that a user desires to edit his/her profile. The currently-loaded module may be configured to process the requested route. However, the currently-loaded module may need to send, to server 130, a request for web content (e.g., an HTML file) that is associated with the requested route. Thus, while an instance of a single module may be used to process multiple routes, each of the multiple routes may be associated with a different set of web content, such as HTML files.

Deleting Modules

In some scenarios, a loaded module is not configured to process a requested route. For example, if a profile module is currently loaded and a user requests a route that can only be served by a search module, then the search module needs to be loaded.

In an embodiment, a loaded module is deleted (or unloaded) in response to determining that (1) the loaded module cannot serve a requested route and/or (2) the requested route is not already loaded. For example, a module that was loaded in response to requested route "/profile/" may not be able to serve requested route "/mail/", which, when served by the appropriate module, allows a user to access a set of electronic messages (e.g., instant messages or email messages) that have been addressed and sent to the user's account. The currently-loaded "profile" module may not be configured to provide information about the user's electronic messages.

The first determination (i.e., that a loaded module cannot server a requested route) may be performed by the loaded module and the second determination (i.e., that the requested route is not already loaded) may be performed by route handler 116.

Deleting a loaded module may involve deleting an instance of the module that is executing in the runtime environment and de-allocating memory that was used to store the instance and variables and data generated by the module. Deleting a loaded module may also involve deleting all data files (e.g., JavaScript files and CSS files) that are used to generate the module instance.

Client-Side Caching

After the date files of a particular module are downloaded to client device 110, SPA 114 loads an instance of the particular module into the runtime environment. If the instance of the particular module is no longer needed (such as when another requested route is received that requires a different module), then SPA 114 may cause the instance (along with other artifacts of the instance, such as search results) to be deleted from the runtime environment. In this way, the memory footprint of SPA 114 is kept relatively small.

However, in an embodiment, even though the instance of the particular module is deleted, host application 112 includes caching functionality that is utilized such that the data files associated with the module are cached on client device 110. Thus, if a route associated with the particular module is subsequently requested, then the data files of the particular module are already stored on client device 110. Therefore, a roundtrip with server 130 to retrieve the appropriate data files is avoided.

Pre-Fetching

In an embodiment, requested route history data (or simply "history data") that indicates one or more routes that were requested previously is maintained. History data may be stored on client device 110 or by server 130.

History data may further indicate how often and/or when the one or more routes were requested. For example, the history data may indicate that route "/profile/" was selected five times and that route "/search/" was last selected one day ago.

By analyzing the history data, SPA 114 (or server 130) may determine that one or more particular routes (and their associated dependency information) should be sent to client device 110 prior to route handler 116 receiving a requested route that matches the one or more particular routes. Sending route data and dependency data prior to receiving a requested route from a user is referred to herein as "pre-fetching." For example, if a user almost always first selects route "/search/" after loading SPA 114, then SPA 114 (or server 130) may determine to request (or transmit) route "/search/" and its dependency information before the user selects that route. In this way, the dependency information needed to create an instance of the search module may already be stored on client device 110 when the user eventually selects that route.

Benefits

One benefit of an embodiment herein is that developers of a module (or sub-application) of a SPA can develop the module without having any knowledge of other modules of the SPA. Thus, managing a single large router among potentially many different development teams is avoided. Another benefit of an embodiment herein is that SPAs have a much smaller memory footprint since the routes and the dependency information associated with those routes do not have to be downloaded at once, when the SPA is downloaded. Instead, data files of modules that execute within a SPA are downloaded when needed.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
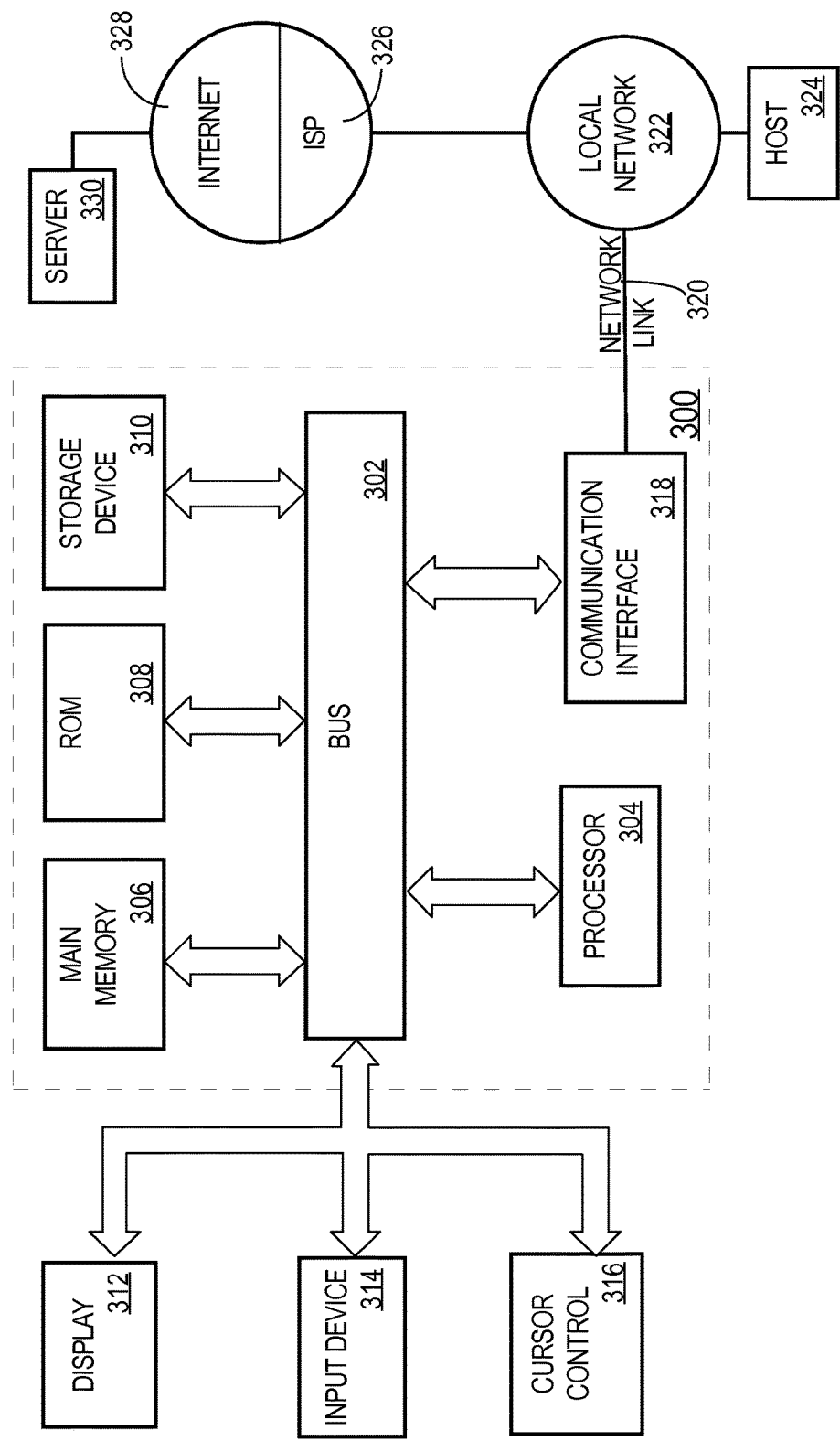
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
  receiving, at a client device, from a server, a web document data;
  in response to receiving the web document data:
    executing, at the client device, based on the web document data, an application, and
    creating a router process within the application;
  wherein the application is a single-page application;
  after creating the router process, receiving, at the client device, input that indicates a particular route;
  in response to receiving the input that indicates the particular route:
    determining, by the router process, whether the particular route is indicated in a list of routes;
    in response to determining that the particular route is not indicated in the list of routes, causing, by the router process, the particular route to be sent to the server;
  after causing the particular route to be sent to the server, receiving, from the server, at the client device, a set of routes that is associated with the particular route.
2. The method of claim 1, wherein receiving the set of routes further comprises receiving, at the client device, one or more files that are associated with a module that is used to process each route in the set of routes.

3. The method of claim 2, wherein the one or more files comprise one or more JavaScript files and one or more Cascading Style Sheet (CSS) files.

4. The method of claim 2, further comprising:
generating an instance of the module based on the one or more files and loading the instance of the module into the application.

5. The method of claim 1, wherein:
when the input is received, the router process has access to only a single path and the single path is a wildcard path;
determining that the particular route is not indicated in the list of routes comprises determining that the particular route only matches the wildcard path;
the wildcard path is associated with a function that the router process calls, that accepts the particular route as input, and that causes the particular route to be sent to the server.

6. The method of claim 1, further comprising:
receiving, at the client device, second input, initiated by a user, that indicates a second route that is different than the particular route;
in response to receiving the second input that indicates the second route, determining, by the router process, whether the set of routes includes the second route.

7. The method of claim 6, further comprising:
in response to determining that the set of routes includes the second route and without sending a request to the server, causing a set of data files that is associated with a second module to be retrieved from storage that is located on the client device.

8. The method of claim 6, further comprising:
in response to determining that the set of routes does not include the second route, causing, by the router process, the second route to be sent to the server;
after causing the second route to be sent to the server, receiving, by the router process, a second set of routes that is associated with the second route.

9. The method of claim 8, further comprising:
in response to determining that the set of routes does not include the second route, removing, by the router process, the set of routes;
wherein, after removing the set of routes, the router process does not have access to the set of routes.

10. The method of claim 8, wherein receiving the set of routes further comprises receiving, at the client device, one or more files that are associated with a module, the method further comprising:
generating, at the client device, based on the one or more files, an instance of the module;
loading the instance of the module into the application;
in response to determining that the set of routes does not include the second route, unloading the instance of the module from the application.

11. The method of claim 1, wherein the input is initiated by a user and the particular route is a fragment of a URL.

12. A system comprising:
one or more processors;
one or more storage media storing instructions which, when executed by the one or more processors, cause:
receiving, at a client device, from a server, a web document data;
in response to receiving the web document data:
executing, at the client device, based on the web document data, an application, and
creating a router process within the application;
wherein the application is a single-page web application;
after creating the router process, receiving, at the client device, input that indicates a particular route;
in response to receiving the input that indicates the particular route:
determining, by the router process, whether the particular route is indicated in a list of routes;
in response to determining that the particular route is not indicated in the list of routes, causing, by the router process, the particular route to be sent to the server;
after causing the particular route to be sent to the server, receiving, from the server, at the client device, a set of routes that is associated with the particular route.

13. The system of claim 12, wherein receiving the set of routes further comprises receiving, at the client device, one or more files that are associated with a module that is used to process each route in the set of routes.

14. The system of claim 13, wherein the one or more files comprise one or more JavaScript files and one or more Cascading Style Sheet (CSS) files.

15. The system of claim 13, wherein the instructions, when executed by the one or more processors, further cause:
generating an instance of the module based on the one or more files and loading the instance of the module into the application.

16. The system of claim 12, wherein:
when the input is received, the router process has access to only a single path and the single path is a wildcard path;
determining that the particular route is not indicated in the list of routes comprises determining that the particular route only matches the wildcard path;
the wildcard path is associated with a function that the router process calls, that accepts the particular route as input, and that causes the particular route to be sent to the server.

17. The system of claim 12, wherein the instructions, when executed by the one or more processors, further cause:
receiving, at the client device, second input that indicates a second route that is different than the particular route;
in response to receiving the second input that indicates the second route, determining, by the router process, whether the set of routes includes the second route.

18. The system of claim 17, wherein the instructions, when executed by the one or more processors, further cause:
in response to determining that the set of routes includes the second route and without sending a request to the server, causing a set of data files that is associated with a second module to be retrieved from storage that is located on the client device.

19. The system of claim 17, wherein the instructions, when executed by the one or more processors, further cause:
in response to determining that the set of routes does not include the second route, causing, by the router process, the second route to be sent to the server;
after causing the second route to be sent to the server, receiving, by the router process, a second set of routes that is associated with the second route.

20. The system of claim 19, wherein the instructions, when executed by the one or more processors, further cause:
in response to determining that the set of routes does not include the second route, removing, by the router process, the set of routes;
wherein, after removing the set of routes, the router process does not have access to the set of routes.

21. The system of claim 19, wherein receiving the set of routes further comprises receiving, at the client device, one or more files that are associated with a module, wherein the instructions, when executed by the one or more processors, further cause:
  generating, at the client device, based on the one or more files, an instance of the module;
  loading the instance of the module into the application;
  in response to determining that the set of routes does not include the second route, unloading the instance of the module from the application.

22. The system of claim 12, wherein the input is initiated by a user and the particular route is a fragment of a URL.

\* \* \* \* \*